(12) United States Patent
Lee et al.

(10) Patent No.: US 11,613,221 B2
(45) Date of Patent: Mar. 28, 2023

(54) APPARATUS AND METHOD OF CONTROLLING AN AIRBAG OF A VEHICLE

(71) Applicants: HYUNDAI MOTOR COMPANY, Seoul (KR); KIA CORPORATION, Seoul (KR)

(72) Inventors: Sungwook Lee, Seoul (KR); Seok Ho Hong, Seoul (KR); Sungsoo Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/527,842

(22) Filed: Nov. 16, 2021

(65) Prior Publication Data
US 2022/0203916 A1    Jun. 30, 2022

(30) Foreign Application Priority Data

Dec. 29, 2020    (KR) .......................... 10-2020-0186372

(51) Int. Cl.
*B60R 21/16*    (2006.01)
*B60R 21/0132*    (2006.01)

(52) U.S. Cl.
CPC .......... *B60R 21/0132* (2013.01); *B60R 21/16* (2013.01); *B60R 2021/01325* (2013.01); *B60R 2021/01327* (2013.01)

(58) Field of Classification Search
CPC ................ B60R 21/0132; B60R 21/16; B60R 2021/01325; B60R 2021/01327
See application file for complete search history.

*Primary Examiner* — Mathew Franklin Gordon
(74) *Attorney, Agent, or Firm* — Lempia Summerfield Katz LLC

(57) ABSTRACT

An apparatus and a method of controlling an airbag of a vehicle are capable of securing robustness of an airbag deployment logic and more effectively protecting passengers. The apparatus and method achieve this by determining whether to deploy an airbag based on a post-human injury probability calculated through a human injury probability model and Bayesian network learning (feedback learning). The apparatus includes: a human injury probability calculator configured to calculate a human injury conditional probability and a human injury prediction probability based on vehicle motion information measured by a sensing device; a learner configured to calculate a post-human injury probability by performing a probability-based real-time feedback machine learning based on the human injury conditional probability and the human injury prediction probability; and an airbag deployment determiner configured to determine whether to deploy an airbag based on the post-human injury probability.

18 Claims, 5 Drawing Sheets

(FIG. 5A) PRIOR ART (HIGH POSSIBILITY OF UNDEPLOYED/MISDEPLOYMENT)

(FIG. 5B) DISCLOSURE (LOW POSSIBILITY OF UNDEPLOYED/MISDEPLOYMENT)

APPARATUS AND METHOD OF CONTROLLING AN AIRBAG OF A VEHICLE

CROSS-REFERENCE TO RELATED APPLICATION(S)

This application is based on and claims priority under 35 U.S.C. § 119 to Korean Patent Application No. 10-2020-0186372, filed on Dec. 29, 2020, the disclosure of which is incorporated herein by reference.

BACKGROUND

1. Field

The disclosure relates to a vehicle, and more particularly, to an airbag deployment control in the vehicle.

2. Description of Related Art

An airbag is a device for protecting passengers from an impact when a vehicle collides and is a typical passenger protection device of a vehicle along with a seat belt. When a vehicle collision is detected by a sensor, an operating gas device is detonated, and the airbag is instantaneously inflated (deployed) by an explosive gas to protect the passengers. Accordingly, the shorter a time between a time of collision of the vehicle and the deployment of the airbag, the better.

However, it is necessary to determine whether to deploy the airbag according to whether the impact caused by the vehicle collision is strong enough to require the deployment of the airbag or whether the impact is to a degree that the deployment of the airbag is unnecessary. When the airbag is not deployed in a situation where the airbag must be deployed to protect the passenger, the passenger cannot be protected. Conversely, if the airbag is deployed even in the event of the impact to the extent that the airbag does not need to be deployed, it is undesirable because a use of the airbag is unnecessary, and a cost of rearranging (e.g., replacing, repairing) the airbag may occur.

In other words, it is required to accurately determine whether to deploy the airbag according to a degree of injury of the passenger in a vehicle collision situation.

SUMMARY

An aspect of the disclosure is to provide an airbag control apparatus and method capable of securing robustness of an airbag deployment logic and more effectively protecting passengers by determining whether to deploy an airbag based on a post-human injury probability calculated through a human injury probability model and Bayesian network learning (feedback learning).

Additional aspects of the disclosure are set forth in part in the description which follows and, in part, should become apparent from the description or may be learned by practice of the disclosure.

According to an aspect of the disclosure, an apparatus of controlling an airbag of a vehicle is provided. The apparatus includes: a human injury probability calculator configured to calculate a human injury conditional probability and a human injury prediction probability based on vehicle motion information measured by a sensing device; a learner configured to calculate a post-human injury probability by performing a probability-based real-time feedback machine learning based on the human injury conditional probability and the human injury prediction probability; and an airbag deployment determiner configured to determine whether to deploy the airbag based on the post-human injury probability.

The learner may be configured to calculate a pre-human injury probability based on the human injury conditional probability and the human injury prediction probability, and to calculate the post-human injury probability by multiplying the human injury conditional probability by the pre-human injury probability.

The probability-based real-time feedback machine learning may be configured to update the pre-human injury probability by feeding back a current post-human injury probability to a previous pre-human injury probability.

The human injury conditional probability may be configured to be calculated through Equation 1 below.

$$P(x_t|u_t, x_{t-1}), P(z_t|x_t) \quad \text{[Equation 1]}$$

The expression $P(x_t|u_t, x_{t-1})$ represents human injury prediction probability at a current time point (t) according to measured values of the collision sensors 102 and 106 and a previous (t−1) human injury probability.

The expression $P(z_t|x_t)$ represents human injury prediction probability predicted according to passenger injury measured through simulation.

The term $x_t$ represents actual human injury probability of each of the six areas of a head, a neck, and a chest at the current time point (t).

The term $u_t$ represents the measured value of the sensing device 250 at the current time point (t).

The term $x_{t-1}$ represents actual human injury probability at the previous time point (t−1).

The term $x_t$ represents human injury prediction probability for each of the six areas of the head, the neck, and the chest at the current time point (t).

The pre-human injury probability may be configured to be calculated using Equation 2 below.

$$\overline{(bel(x))} = \int P(x_t|u_t, x_{t-1}) bel(x_{t-1}) dx_{t-1} \quad \text{[Equation 2]}$$

The expression $P(x_t|u_t, x_{t-1})$ represents human injury prediction probability at the measured values of the collision sensors 102 and 106 and the current time point (t) according to the previous (t−1) human injury probability.

The expression represents previous $bel(x_{t-1})$ post-human injury probability.

The pre-human injury probability may be configured to be calculated using Equation 3 below.

$$bel(x) = \eta P(z_t|x_t)\overline{bel(x)} \quad \text{[Equation 3]}$$

The term $\eta$ represents a normalization factor.

The expression $P(z_t|x_t)$ represents human injury prediction probability predicted according to passenger injury measured through simulation.

The expression $\overline{(bel(x))}$ represents pre-human injury probability.

The airbag deployment determiner may be configured to determine to deploy the airbag based on the post-human injury probability exceeding a preset reference value.

The vehicle motion information may include an acceleration value and an angular velocity value of the vehicle, a collision value, a pressure value, a roll value, a pitch value, and a yaw value.

According to an aspect of the disclosure, a method of controlling an airbag of a vehicle is provided. The method includes: calculating, by a human injury probability calculator, a human injury conditional probability and a human injury prediction probability based on vehicle motion information measured by a sensing device; calculating, by a learner, a post-human injury probability by performing a probability-based real-time feedback machine learning based on the human injury conditional probability and the human injury prediction probability; and determining, by an airbag deployment determiner, whether to deploy an airbag based on the post-human injury probability.

The method may further include calculating, by the learner, a pre-human injury probability based on the human injury conditional probability and the human injury prediction probability and may include calculating, by the learner, the post-human injury probability by multiplying the human injury conditional probability by the pre-human injury probability.

The probability-based real-time feedback machine learning may be configured to update the pre-human injury probability by feeding back a current post-human injury probability to a previous pre-human injury probability.

The human injury conditional probability may be configured to be calculated through Equation 1 below.

$$P(x_t|u_t, x_{t-1}), P(z_t|x_t) \quad \text{[Equation 1]}$$

The expression $P(x_t|u_t, x_{t-1})$ represents human injury prediction probability at a current time point (t) according to measured values of the collision sensors 102 and 106 and a previous (t−1) human injury probability.

The expression $P(z_t|x_t)$ represents human injury prediction probability predicted according to passenger injury measured through simulation.

The term $x_t$ represents actual human injury probability of each of the six areas of a head, a neck, and a chest at the current time point (t).

The term $u_t$ represents the measured value of sensing device 250 at the current time point (t).

The term $x_{t-1}$ represents actual human injury probability at the previous time point (t−1).

The term $z_t$ represents human injury prediction probability for each of the six areas of the head, the neck, and the chest at the current time point (t).

The pre-human injury probability may be configured to be calculated using Equation 2 below.

$$\overline{(bel(x))} = \int P(x_t|u_t, x_{t-1}) bel(x_{t-1}) dx_{t-1} \quad \text{[Equation 2]}$$

The expression $P(x_t|u_t, x_{t-1})$ represents human injury prediction probability at the measured values of the collision sensors 102 and 106 and the current time point (t) according to the previous (t−1) human injury probability.

The expression $bel(x_{t-1})$ represents previous (t−1) post-human injury probability.

The pre-human injury probability may be configured to be calculated using Equation 3 below.

$$bel(x) = \eta P(z_t|x_t) \overline{bel(x)} \quad \text{[Equation 3]}$$

The term $\eta$ represents a normalization factor.

The expression $P(z_t|x_t)$ represents human injury prediction probability predicted according to passenger injury measured through simulation.

The expression $\overline{(bel(x))}$ represents pre-human injury probability.

The airbag deployment determiner may be configured to determine to deploy the airbag based on the post-human injury probability exceeding a preset reference value.

The vehicle motion information may include an acceleration value and an angular velocity value of the vehicle, a collision value, a pressure value, a roll value, a pitch value, and a yaw value.

According to another aspect of the disclosure, an apparatus of controlling an airbag of a vehicle Is provided. The apparatus includes: a human injury probability calculator configured to calculate a human injury conditional probability and a human injury prediction probability based on vehicle motion information measured by a sensing device; a learner configured to calculate a pre-human injury probability based on the human injury conditional probability and the human injury prediction probability, to calculate the post-human injury probability by multiplying the human injury conditional probability by the pre-human injury probability, and to update the pre-human injury probability by feeding back a current post-human injury probability to a previous pre-human injury probability through probability-based real-time feedback machine learning; and an airbag deployment determiner configured to determine whether to deploy the airbag based on the post-human injury probability.

According to another aspect of the disclosure, a method of controlling an airbag of a vehicle is provided. The method includes: calculating, by a human injury probability calculator, a human injury conditional probability and a human injury prediction probability based on vehicle motion information measured by a sensing device; calculating, by a learner, a pre-human injury probability based on the human injury conditional probability and the human injury prediction probability; calculating, by the learner, the post-human injury probability by multiplying the human injury conditional probability by the pre-human injury probability; updating, by the learner, the pre-human injury probability by feeding back a current post-human injury probability to a previous pre-human injury probability through probability-based real-time feedback machine learning; and determining, by an airbag deployment determiner, whether to deploy an airbag based on the post-human injury probability.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
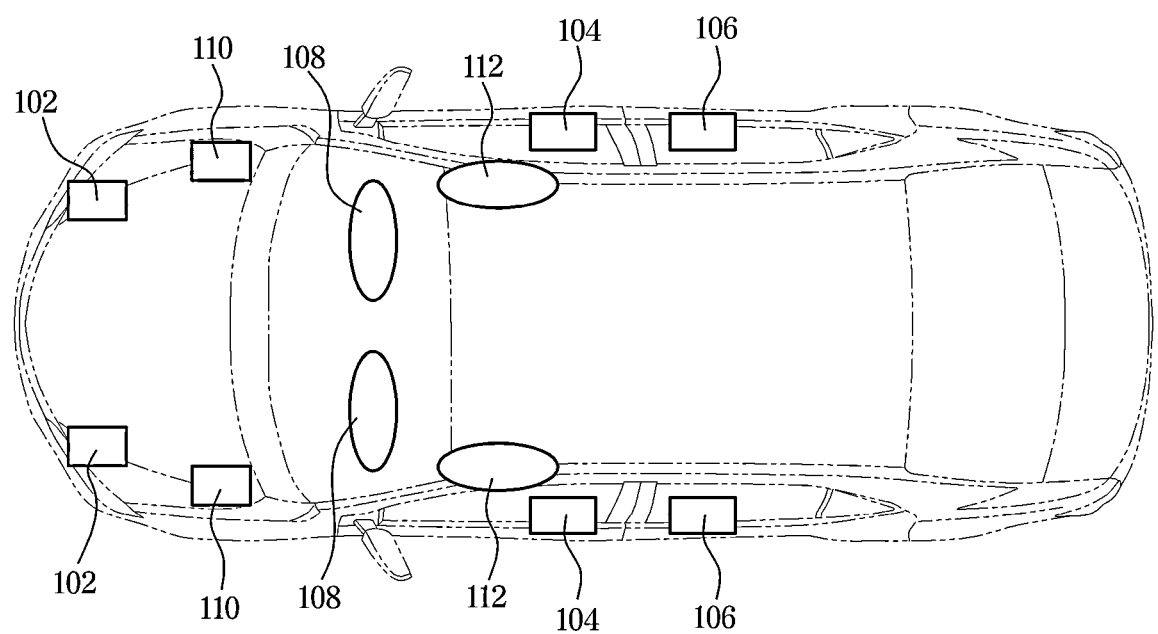
FIG. 1 is a view illustrating a vehicle according to an embodiment.

FIG. 1 is a view illustrating a vehicle according to an embodiment. When a component, device, element, or the like of the present disclosure is described as having a purpose or performing an operation, function, or the like, the component, device, or element should be considered herein as being "configured to" meet that purpose or perform that operation or function.

Referring to FIG. 1, collision sensors 102 and 106, pressure sensors 104, angular velocity sensors 110, and airbags 108 and 112 are installed in a vehicle.

At least one pair of frontal collision sensors 102 are installed at a front of the vehicle to detect whether the vehicle has a frontal collision and an intensity of the collision. At least one pair of side pressure sensors 104 are installed on both sides of the vehicle to detect pressure applied to both sides of the vehicle. At least one pair of side collision sensors 106 are installed on both sides of the vehicle to detect whether the vehicle collides with the side of the vehicle and the intensity of the collision.

In the vehicle according to the embodiment, at least one pair of angular velocity sensors 110 for detecting a collision direction in addition to the collision sensors 102 and 106 and the pressure sensors 104 may be further installed.

The airbags 108 and 112 may include front airbags 108 and side airbags 112.

At least one pair of front airbags 108 are respectively installed on a front side of a driver's seat and a front side of a passenger's seat. The side airbags 112 are installed on a left side of the driver's seat and a right side of the passenger's seat, respectively.

In order to secure vehicle motion information, in addition to the sensors illustrated in FIG. 1, the vehicle may further include other types of sensors for measuring an acceleration value, an angular velocity value, a collision value, a pressure value, a roll value, a pitch value, a yaw value, and the like.

Figure 2:
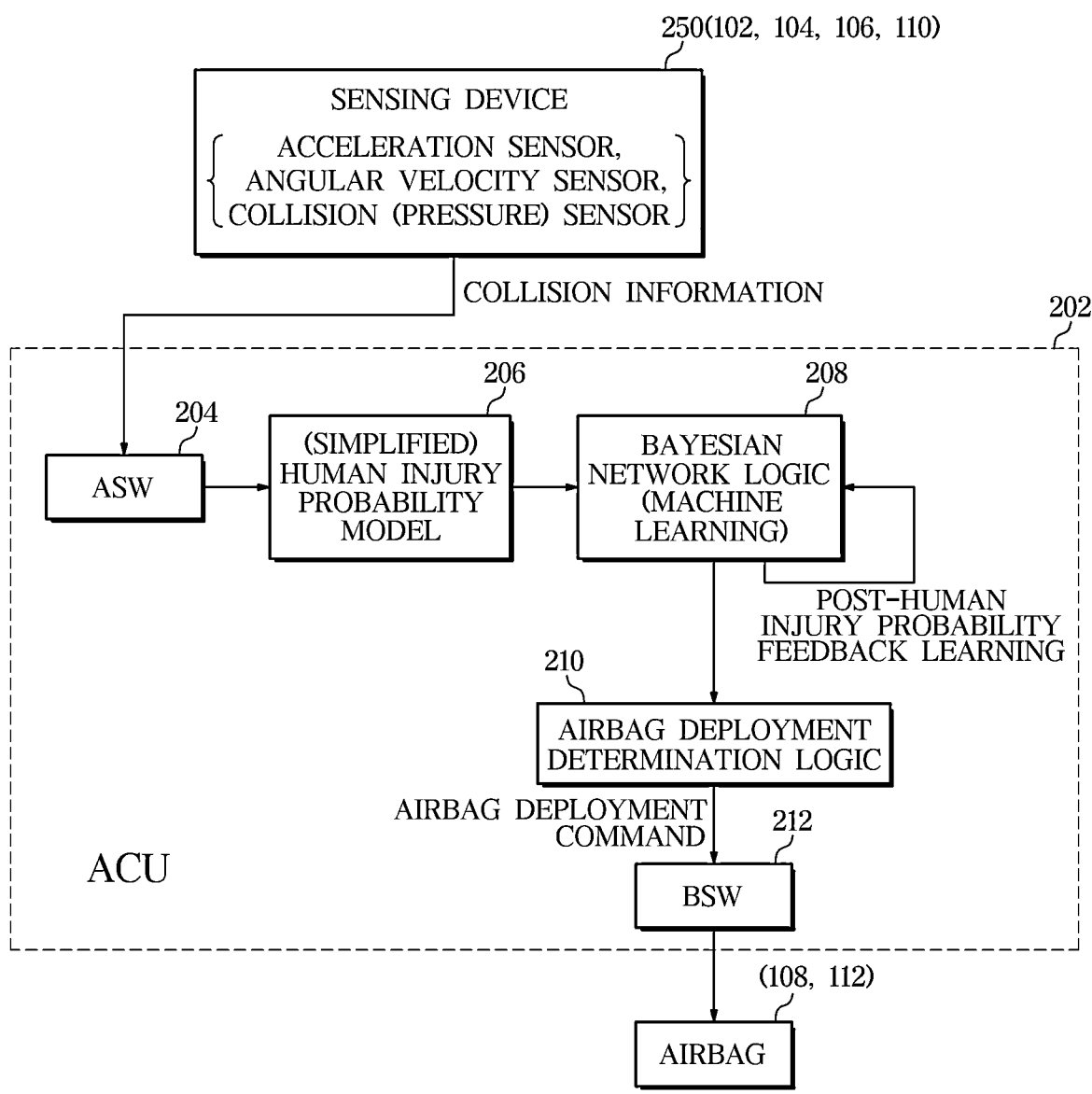
FIG. 2 is a view illustrating an airbag control apparatus according to an embodiment.

FIG. 2 is a view illustrating an airbag control apparatus according to an embodiment.

Referring to FIG. 2, a sensing device 250 is a name encompassing all of the sensors 102, 104, 106, and 110 described in FIG. 1 and sensors for obtaining the vehicle motion information.

An airbag control apparatus (Air-bag Control Unit, ACU) 202 of the vehicle according to the embodiment illustrated in FIG. 2 may determine whether to deploy the airbags 108 and 112 based on a measurement result of the sensing device 250 and generate an airbag deployment command. The airbag control apparatus 202 may include an application software (ASW) 204, a human injury probability model 206, a Bayesian network logic 208, an airbag deployment determination logic 210, and a basic software (BSW) 212.

The ASW 204 may drive application software installed in the airbag control apparatus 202.

The human injury probability model 206 (human injury probability calculator) may be provided to reflect the measurement result of the sensing device 250 when the vehicle collides with another vehicle or obstacles to calculate a human injury prediction probability. The human injury prediction probability calculated from the human injury probability model 206 may refer to a human injury probability predicted by inputting the measurement result of the sensing device 250 when the vehicle collision occurs into a human injury model obtained through various experiments such as simulation. In the human injury probability model 206, a relatively simplified human body structure model may be applied in order to maintain an amount of computation within an appropriate level when calculating the human injury probability.

The Bayesian network logic (learning device) 208 may calculate the post-human injury probability through a probability-based machine learning from the human injury prediction probability, which is a calculation result of the human injury probability model 206. The Bayesian network logic 208 may also determine whether to deploy the airbags 108 and 112 based on the calculation result of the post-human injury probability. However, the Bayesian network logic 208 may obtain a more reliable basis for determining whether to deploy the airbag with an error corrected by newly updating a pre-human injury probability of a previous cycle through a feedback of post-human injury probability values. Here, the post-human injury probability is a result of machine learning in the Bayesian network logic 208 according to an embodiment and is a basis for determining whether the airbags 108 and 112 are deployed.

The airbag deployment determination logic 210 (airbag deployment determination device) may determine whether to deploy the airbags 108 and 112 based on the post-human injury probability value calculated by the Bayesian network logic 208. The airbag deployment determination logic 210 may generate the airbag deployment command when the post-human injury probability value exceeds a predetermined reference value so that the airbags 108 and 112 can be deployed.

The BSW 212 may drive basic software installed in the airbag control apparatus 202. The airbag deployment command generated by the airbag deployment determination logic 210 may be transmitted to the airbags 108 and 112 through the BSW 212.

Figure 3:
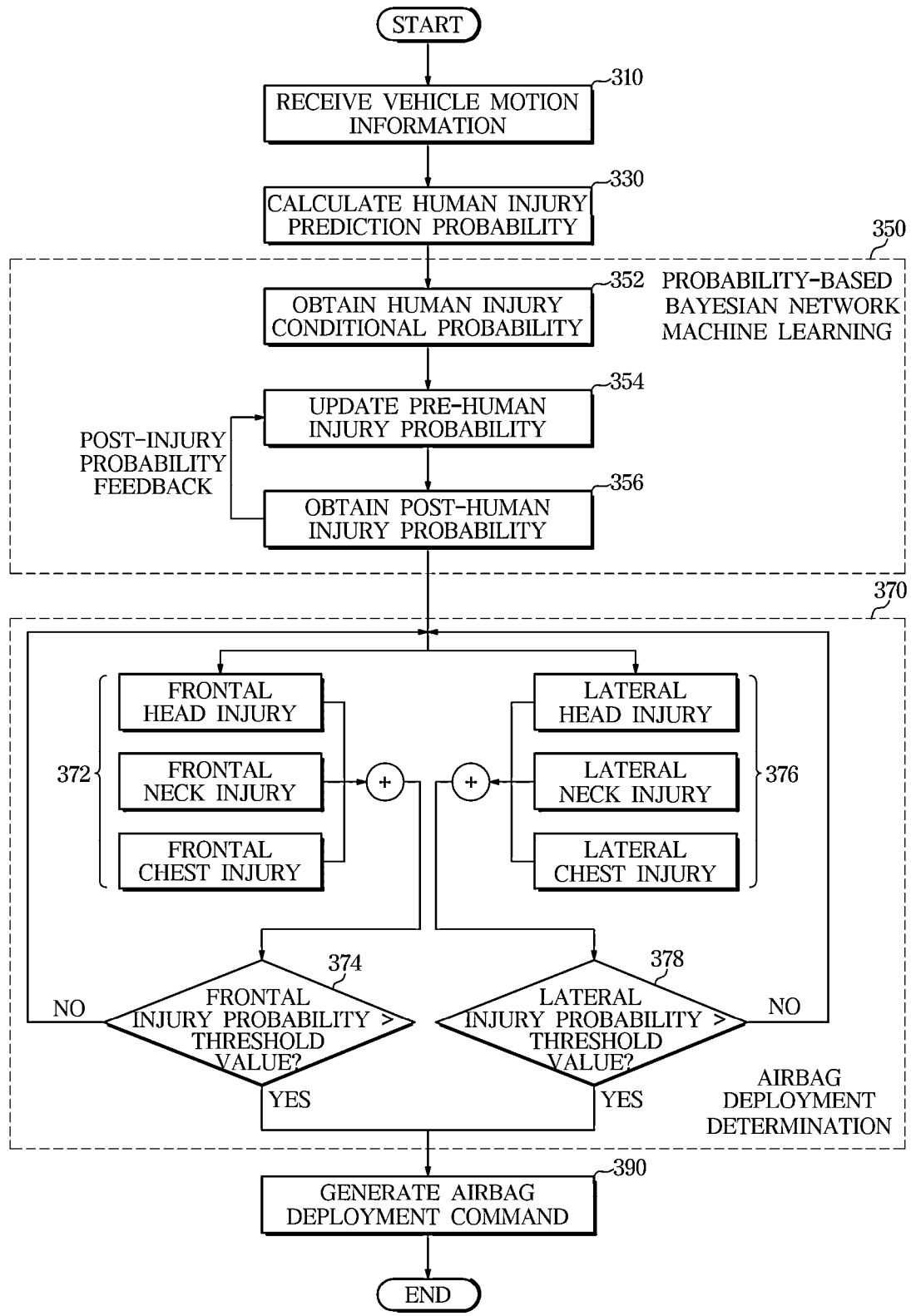
FIG. 3 is a view illustrating an airbag deployment control method of a vehicle according to an embodiment.

FIG. 3 is a view illustrating an airbag deployment control method of a vehicle according to an embodiment.

Referring to FIG. 3, the airbag control apparatus 202 may receive the vehicle motion information including the acceleration value, the angular velocity value, the collision value, the pressure value, the roll value, the pitch value, and the yaw value measured by the sensing device 250 (310). The vehicle motion information may be transmitted to the human injury probability model 206 through the ASW 204 of the airbag control apparatus 202 described in FIG. 2.

The human injury probability model 206 that receives the vehicle motion information may calculate the human injury prediction probability for a current collision based on the vehicle motion information (330). In other words, the vehicle motion information measured through the sensing device 250 may be reflected in a predetermined human injury model to predict a human injury probability value. The human injury prediction probability may include a human injury conditional probability. The human injury conditional probability is the same as P (pulse I injury degree) and may refer to the probability that a magnitude value of a vehicle collision pulse according to the injury degree occurs. In other words, the human injury conditional probability may refer to the probability of the injury degree at a current time according to the collision pulse of the vehicle.

In other words, several detection values detected by the sensing device 250 are input to the human injury probability model 206 and used to calculate a degree of human injury probability (human injury conditional probability) of a head, a neck, and a chest. The human injury probability model 206 may have a total of 12 degrees of freedom of translation (XY) and rotation (pitch, roll, and yaw) of the vehicle. The measured value of the sensing device 250 input to the human injury probability model 206 may be calculated as a total of six human injury prediction probabilities of each part of the human body. The six human injury prediction probabilities may include the probabilities of frontal head injury, lateral head injury, frontal neck injury, lateral neck injury, frontal chest injury, and lateral chest injury. The human injury conditional probability value may be outputted from the human injury probability model 206 together with the six human injury prediction probability values and input to the Bayesian network logic 208.

The Bayesian network logic 208 may perform machine learning using a Bayesian network based on the human injury prediction probability and human injury conditional probability calculated by the human injury probability model 206. The Bayesian network logic 208 may also generate a pre-human injury probability value and the post-human injury probability value as a result of machine learning (350).

A probability-based Bayesian network machine learning 350 in the Bayesian network logic 208 may include obtaining the human injury conditional probability (352), obtaining the pre-human injury probability (354), and a post-human injury probability calculation 356. The probability-based Bayesian network machine learning of the vehicle according to the embodiment may include a real-time feedback learning of the post-human injury probability.

In other words, the pre-human injury probability value in a next cycle may be updated by feeding back the post-human injury probability value obtained through the post-human injury probability calculation 356 to the pre-human injury probability 354 of the next cycle in real time. The post-human injury probability value may be corrected by this update, so that a more accurate determination of whether to deploy the airbag can be made.

First, the Bayesian network logic 208 may obtain the human injury conditional probability and the pre-human injury probability from the human injury prediction probability of the human injury probability model 206 (352, 354). Among them, the pre-human injury conditional probability may be obtained through Equation 1 below.

$$P(x_t|u_t,x_{t-1}), P(z_t|x_t) \qquad \text{[Equation 1]}$$

Equation 1 is particularly described as follows.

The expression $P(x_t|u_t,x_{t-1})$ represents human injury prediction probability at a current time point (t) according to measured values of the collision sensors 102 and 106 and a previous (t−1) human injury probability.

The expression $P(z_t|x_t)$ represents human injury prediction probability predicted according to passenger injury measured through simulation.

The term $x_t$ represents actual human injury probability of each of the six areas of the head, neck and chest at the current time point (t).

The term $u_t$ represents the measured value of sensing device 250 at the current time point (t).

The term $x_{t-1}$ represents actual human injury probability at the previous time point (t−1).

The term $z_t$ represents human injury prediction probability for each of the six areas of the head, neck, and chest at the current time point (t).

Then, in the Bayesian network logic 208, the pre-human injury probability update, as illustrated in Equation 2 below, may be performed (354). The human injury conditional probability obtained in operation 352 is then multiplied by the pre-human injury probability value obtained in operation 354 to obtain the post-human injury probability (356).

At this time, the pre-human injury probability value may be an updated value through feedback of the previous post-human injury probability value. The pre-human injury probability and the post-human injury probability may be obtained through Equation 2 and Equation 3 below, respectively.

$$\overline{(bel(x))} = \int P(x_t|u_t,x_{t-1})bel(x_{t-1})dx_{t-1} \qquad \text{[Equation 2]}$$

Equation 2 is the pre-human injury probability and Equation 2 is described in detail as follows.

The expression $P(x_t|u_t,x_{t-1})$ represents human injury prediction probability at the measured values of the collision sensors 102 and 106 and the current time point (t) according to the previous (t−1) human injury probability.

The expression $bel(x_{t-1})$ represents previous (t−1) post-human injury probability.

$$bel(x) = \eta P(z_t|x_t)\overline{bel(x)} \qquad \text{[Equation 3]}$$

Equation 3 is the post-human injury probability, and Equation 3 is described in detail as follows.

The term $\eta$ represents a normalization factor.

The expression $P(z_t|x_t)$ represents human injury prediction probability predicted according to passenger injury measured through simulation.

The expression $\overline{(bel(x))}$ represents pre-human injury probability.

Here, the calculation of the post-human injury probability through the probability-based Bayesian network machine learning according to the embodiment is described with reference to FIG. 4.

Figure 4:
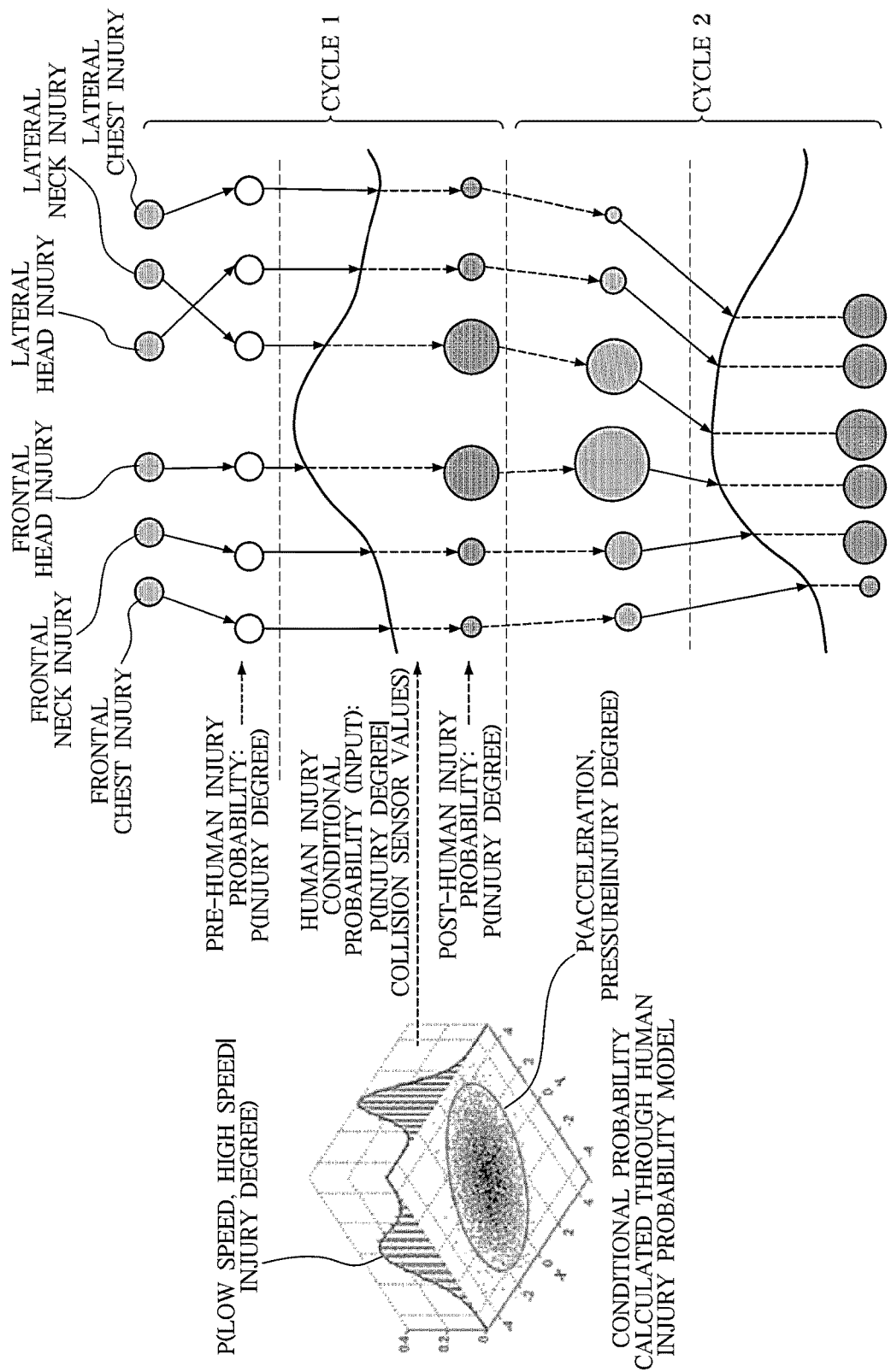
FIG. 4 is a view illustrating a probability-based Bayesian network machine learning of the airbag deployment control method illustrated in FIG. 3.

FIG. 4 is a view illustrating a probability-based Bayesian network machine learning of the airbag deployment control method illustrated in FIG. 3.

Referring to FIG. 4, the probability-based Bayesian network machine learning of the Bayesian network logic 208 may include obtaining the human injury conditional probability, obtaining the pre-human injury probability, and calculating the post-human injury probability. In addition, the probability-based Bayesian network machine learning may include real-time feedback learning of the post-human injury probability. In other words, by feeding back the calculation result of the post-human injury probability to the pre-human injury probability in real time so that the pre-human injury probability value is updated, the decision of whether to deploy the airbag is more accurately corrected. As illustrated in FIG. 4, the cycle to obtain the post-human injury probability may be repeated continuously. At this time, an output (post-human injury probability) of the previous cycle becomes an input (pre-human injury probability) of the next cycle.

Returning to FIG. 3, the airbag deployment determination logic 210 may determine the airbag deployment according to whether the post-human injury probability value calculated by the Bayesian network logic 208 exceeds a preset threshold value for the airbag deployment (370). In other words, when the post-human injury probability value exceeds the preset threshold value, it is determined to deploy the airbags 108 and 112. Conversely, when the post-human injury probability value is less than or equal to the preset threshold value, it is determined not to deploy the airbags 108 and 112.

In other words, the airbag deployment determination logic 210 may calculate a sum of the frontal injury probabilities based on the values of the frontal head injury probability, the frontal neck injury probability, and the frontal chest injury probability (372).

Also, the airbag deployment determination logic 210 may identify whether the sum of the frontal injury probabilities exceeds a preset frontal airbag deployment threshold value (374).

In addition, the airbag deployment determination logic 210 may calculate a sum of the lateral injury probability based on the values of the lateral head injury probability, the lateral neck injury probability, and the lateral chest injury probability (376).

Also, the airbag deployment determination logic 210 may identify whether the sum of the lateral injury probability exceeds a preset lateral airbag deployment threshold value (378).

The airbag deployment determination logic 210 may generate the airbag deployment command to deploy the airbag when the sum of the injury probabilities exceeds the preset airbag deployment threshold value (YES in 374 or YES in 378) (390). When the sum of the frontal injury probabilities exceeds the preset frontal airbag deployment threshold value (YES in 374), the airbag deployment determination logic 210 may generate a frontal airbag deployment command to deploy the frontal airbag. When the sum of the lateral injury probabilities exceeds the preset lateral airbag deployment threshold value (YES in 378), the airbag deployment determination logic 210 may generate a lateral airbag deployment command to deploy the lateral airbag. Both the front airbag deployment command and the lateral airbag deployment command may occur.

Figure 5:
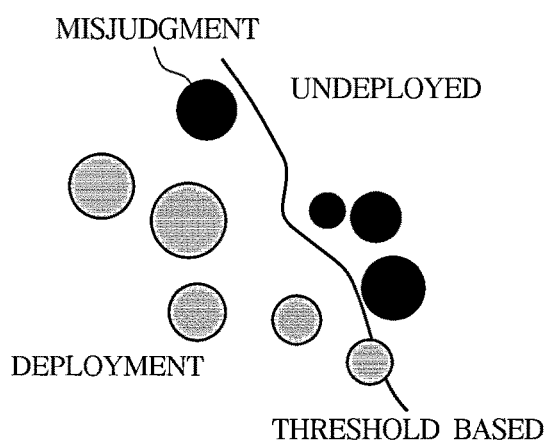
FIG. 5 is a view comparing an airbag deployment determination result according to an embodiment with that of a prior art result.
Figure 5:
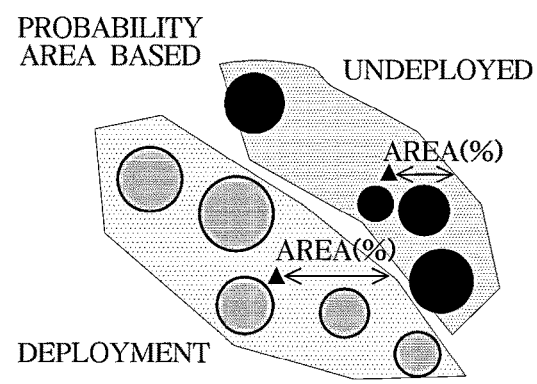

FIG. 5 is a view comparing an airbag deployment determination result according to an embodiment with that of a prior art.

As illustrated in FIG. 5A, in a conventional case, the airbag deployment threshold value may be determined based on limited collision data. In the conventional threshold-based control, the airbag deployment threshold value is set incorrectly. Thus, it may not be possible to accurately determine the airbag deployment and non-deployment situations.

Alternatively, in the embodiment of the disclosure, as illustrated in FIG. 5B, by predicting the degree of human injury probability through the real-time feedback machine learning using the Bayesian network based on the probability model, and by determining and correcting whether the airbag is deployed based on the predicted human injury probability, it is possible to more accurately determine whether to deploy the airbag.

According to the embodiments of the disclosure, by determining whether to deploy the airbag based on the post-human injury probability calculated through a probability model and Bayesian network learning (feedback learning), it is possible to secure the robustness of the airbag deployment logic and more effectively protect the passengers.

The disclosed embodiments are merely illustrative of the technical idea. Those having ordinary skill in the art should appreciate that various modifications, changes, and substitutions may be made without departing from the essential characteristics thereof. Therefore, the embodiments disclosed above, and the accompanying drawings, are not intended to limit the technical idea, but to describe the technical spirit of the disclosure. The scope of the technical idea is not limited by the embodiments and the accompanying drawings. The scope of protection shall be interpreted by the following claims, and all technical ideas within the scope of equivalent shall be interpreted as being included in the scope of rights.

What is claimed is:

1. An apparatus of controlling an airbag of a vehicle, the apparatus comprising:
    a human injury probability calculator configured to calculate a human injury conditional probability and a human injury prediction probability based on vehicle motion information measured by a sensing device;
    a learner configured to calculate a post-human injury probability by performing a probability-based real-time feedback machine learning, based on the human injury conditional probability and the human injury prediction probability; and
    an airbag deployment determiner configured to determine whether to deploy the airbag based on the post-human injury probability.

2. The apparatus according to claim 1, wherein the learner is configured to:
    calculate a pre-human injury probability based on the human injury conditional probability and the human injury prediction probability, and
    calculate the post-human injury probability by multiplying the human injury conditional probability by the pre-human injury probability.

3. The apparatus according to claim 2, wherein the probability-based real-time feedback machine learning is configured to update the pre-human injury probability by feeding back a current post-human injury probability to a previous pre-human injury probability.

4. The apparatus according to claim 2, wherein the human injury conditional probability is configured to be calculated through Equation 1:

$$P(x_t|u_t,x_{t-1}), P(z_t|x_t), \text{wherein} \qquad [\text{Equation 1}]$$

$P(x_t|u_t,x_{t-1})$ is a human injury prediction probability at a current time point (t) according to measured values of collision sensors and a previous (t−1) human injury probability, $P(z_t|x_t)$ is the human injury prediction probability predicted according to passenger injury measured through simulation, $x_t$ is an actual human injury probability of each of the six areas of a head, a neck, and a chest at the current time point (t), $u_t$ is a measured value of a sensing device at the current time point (t), $x_{t-1}$ is an actual human injury probability at the previous time point (t−1), and $z_t$ is a human injury prediction probability for each of the six areas of the head, the neck, and the chest at the current time point (t).

5. The apparatus according to claim 2, wherein the pre-human injury probability is configured to be calculated using Equation 2:

$$\overline{(bel(x))} = \int P(x_t|u_t,x_{t-1}) bel(x_{t-1}) dx_{t-1}, \text{wherein} \qquad [\text{Equation 2}]$$

$P(x_t|u_t,x_{t-1})$ is a human injury prediction probability at the measured values of the collision sensors and the current time point (t) according to the previous (t−1) human injury probability, and $bel(x_{t-1})$ is a previous (t−1) post-human injury probability.

6. The apparatus according to claim 2, wherein the pre-human injury probability is configured to be calculated using Equation 3:

$$bel(x) = \eta P(z_t|x_t)\overline{bel(x)}, \text{wherein} \qquad [\text{Equation 3}]$$

$\eta$ is a normalization factor, $P(z_t|x_t)$ is a human injury prediction probability predicted according to passenger injury measured through simulation, and $\overline{(bel(x))}$ is a pre-human injury probability.

7. The apparatus according to claim 1, wherein the airbag deployment determiner is configured to determine to deploy the airbag based on the post-human injury probability exceeding a preset reference value.

8. The apparatus according to claim 1, wherein the vehicle motion information comprises an acceleration value and an angular velocity value of the vehicle, a collision value, a pressure value, a roll value, a pitch value, and a yaw value.

9. A method of controlling an airbag of a vehicle, the method comprising:
- calculating, by a human injury probability calculator, a human injury conditional probability and a human injury prediction probability based on vehicle motion information measured by a sensing device;
- calculating, by a learner, a post-human injury probability by performing a probability-based real-time feedback machine learning based on the human injury conditional probability and the human injury prediction probability; and
- determining, by an airbag deployment determiner, whether to deploy the airbag based on the post-human injury probability.

10. The method according to claim 9, further comprising:
- calculating, by the learner, a pre-human injury probability based on the human injury conditional probability and the human injury prediction probability; and
- calculating, by the learner, the post-human injury probability by multiplying the human injury conditional probability by the pre-human injury probability.

11. The method according to claim 10, wherein the probability-based real-time feedback machine learning is configured to update the pre-human injury probability by feeding back a current post-human injury probability to a previous pre-human injury probability.

12. The method according to claim 10, wherein the human injury conditional probability is configured to be calculated through Equation 1:

$$P(x_t|u_t, x_{t-1}), P(z_t|x_t), \text{ wherein} \qquad \text{[Equation 1]}$$

$P(x_t|u_t, x_{t-1})$ is a human injury prediction probability at a current time point (t) according to measured values of collision sensors and a previous (t−1) human injury probability, $P(z_t|x_t)$ is a human injury prediction probability predicted according to passenger injury measured through simulation, $x_t$ is an actual human injury probability of each of the six areas of a head, a neck, and a chest at the current time point (t), $u_t$ is a measured value of a sensing device at the current time point (t), $x_{t-1}$ is an actual human injury probability at the previous time point (t−1), and $z_t$ is a human injury prediction probability for each of the six areas of the head, the neck, and the chest at the current time point (t).

13. The method according to claim 10, wherein the pre-human injury probability is configured to be calculated using Equation 2:

$$\overline{bel(x)} = \int P(x_t|u_t, x_{t-1}) bel(x_{t-1}) dx_{t-1}, \text{ wherein} \qquad \text{[Equation 2]}$$

$P(x_t|u_t, x_{t-1})$ is a human injury prediction probability at the measured values of the collision sensors and the current time point (t) according to the previous (t−1) human injury probability, and $bel(x_{t-1})$ is a previous (t−1) post-human injury probability.

14. The method according to claim 10, wherein the pre-human injury probability is configured to be calculated using Equation 3:

$$bel(x) = \eta P(z_t|x_t)\overline{bel(x)}, \text{ wherein} \qquad \text{[Equation 3]}$$

$\eta$ is a normalization factor, $P(z_t|x_t)$ is a human injury prediction probability predicted according to passenger injury measured through simulation, and $\overline{(bel(x))}$ is a pre-human injury probability.

15. The method according to claim 9, wherein the airbag deployment determiner is configured to determine to deploy the airbag based on the post-human injury probability exceeding a preset reference value.

16. The method according to claim 9, wherein the vehicle motion information comprises an acceleration value and an angular velocity value of the vehicle, a collision value, a pressure value, a roll value, a pitch value, and a yaw value.

17. An apparatus of controlling an airbag of a vehicle, the apparatus comprising:
- a human injury probability calculator configured to calculate a human injury conditional probability and a human injury prediction probability based on vehicle motion information measured by a sensing device;
- a learner configured to
    - calculate a pre-human injury probability based on the human injury conditional probability and the human injury prediction probability,
    - calculate the post-human injury probability by multiplying the human injury conditional probability by the pre-human injury probability, and
    - update the pre-human injury probability by feeding back a current post-human injury probability to a previous pre-human injury probability through probability-based real-time feedback machine learning; and
- an airbag deployment determiner configured to determine whether to deploy an airbag based on the post-human injury probability.

18. A method of controlling an airbag of a vehicle, the method comprising:
- calculating, by a human injury probability calculator, a human injury conditional probability and a human injury prediction probability based on vehicle motion information measured by a sensing device;
- calculating, by a learner, a pre-human injury probability based on the human injury conditional probability and the human injury prediction probability;
- calculating, by the learner, the post-human injury probability by multiplying the human injury conditional probability by the pre-human injury probability;
- updating, by the learner, the pre-human injury probability by feeding back a current post-human injury probability to a previous pre-human injury probability through probability-based real-time feedback machine learning; and
- determining, by an airbag deployment determiner, whether to deploy an airbag based on the post-human injury probability.

* * * * *